UNITED STATES PATENT OFFICE.

THOMAS H. BROWN AND JOHN E. STAPLES, OF WELLINGTON, NEW ZEALAND.

BRANDING FLUID.

SPECIFICATION forming part of Letters Patent No. 720,779, dated February 17, 1903.

Application filed December 17, 1902. Serial No. 135,660. (No specimens.)

*To all whom it may concern:*

Be it known that we, THOMAS HORBY BROWN and JOHN ERNEST STAPLES, subjects of the King of Great Britain, residing at Wellington, in the Colony of New Zealand, have invented a new and useful Branding Fluid for Carcasses, Poultry, Eggs, and the Like; and we do hereby declare the following to be a full, clear, and exact description of the same.

The branding fluid that forms the subject of the present invention has been devised for the purpose of providing a fluid that will not harm or deteriorate the quality of the goods upon which it is placed and at the same time will form a perfectly legible mark.

The branding fluid consists of a composition of the following ingredients mixed together in the following relative proportions, viz: mitigated caustic, twenty grains; logwood, one dram; water, one dram; methylated spirits, 6 drams, (about.)

The mitigated caustic employed in the composition is that chemically known as "lunar caustic," (nitrate of silver.)

The whole of the ingredients are mixed together in any approved manner, and the resulting composition is applied to the goods to be branded by means of any known methods.

What we claim as our invention, and desire to secure by Letters Patent, is—

A branding fluid for carcasses, poultry, eggs and the like consisting of a composition of mitigated caustic, logwood, water and methylated spirits mixed together in the proportions or approximate proportions herein specified.

In testimony whereof we have signed this specification in the presence of two subscribing witnesses.

T. H. BROWN.
J. E. STAPLES.

Witnesses:
W. ALEXANDER,
IVY W. BARRAUD.